(12) United States Patent
Kean et al.

(10) Patent No.: US 8,948,191 B2
(45) Date of Patent: Feb. 3, 2015

(54) INTELLIGENT TRAFFIC QUOTA MANAGEMENT

(75) Inventors: Brian Kean, Cincinnati, OH (US); Suraj Jaiswal, Santa Clara, CA (US); Swapna Yelamanchi, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 467 days.

(21) Appl. No.: 13/316,281

(22) Filed: Dec. 9, 2011

(65) Prior Publication Data

US 2013/0148668 A1 Jun. 13, 2013

(51) Int. Cl.
*H04L 12/28* (2006.01)
*H04L 12/911* (2013.01)
*H04L 12/14* (2006.01)
*H04L 12/24* (2006.01)

(52) U.S. Cl.
CPC ............ *H04L 47/70* (2013.01); *H04L 12/1435* (2013.01); *H04L 41/50* (2013.01)
USPC .......................................... 370/401; 709/226

(58) Field of Classification Search
None
See application file for complete search history.

(56) References Cited

U.S. PATENT DOCUMENTS

| | | | | |
|---|---|---|---|---|
| 5,946,686 | A * | 8/1999 | Schmuck et al. | 707/783 |
| 6,331,970 | B1 * | 12/2001 | Nieh et al. | 370/230 |
| 6,577,621 | B1 * | 6/2003 | Balachandran | 370/352 |
| 7,111,052 | B1 * | 9/2006 | Cook | 709/219 |
| 7,743,038 | B1 * | 6/2010 | Goldick | 707/694 |
| 7,933,983 | B2 * | 4/2011 | Steele et al. | 709/224 |
| 8,385,349 | B2 * | 2/2013 | Yuang et al. | 370/395.2 |
| 8,639,595 | B1 * | 1/2014 | Brooker et al. | 705/30 |
| 8,688,825 | B1 * | 4/2014 | Shani | 709/224 |
| 2002/0041606 | A1 * | 4/2002 | Chin et al. | 370/468 |
| 2003/0028641 | A1 * | 2/2003 | Zhang et al. | 709/226 |
| 2003/0156603 | A1 * | 8/2003 | Rakib et al. | 370/485 |
| 2003/0200317 | A1 | 10/2003 | Zeitak et al. | |
| 2004/0081092 | A1 * | 4/2004 | Rhee et al. | 370/230 |
| 2004/0199634 | A1 * | 10/2004 | Jackowski et al. | 709/226 |
| 2004/0267897 | A1 * | 12/2004 | Hill et al. | 709/217 |

(Continued)

OTHER PUBLICATIONS

"3GPP TS 23.401, 3rd Generation Partnership Project, Technical Specification Group Services and System Aspects, General Packet Radio Service (GPRS) enhancements for Evolved Universal Terrestrial Radio Access Network (E-UTRAN) access (Release 10)", Sep. 2011, 282 pages, V10.5.0, 3GPP Organizational Partners.

(Continued)

*Primary Examiner* — Bunjob Jaroenchonwanit
(74) *Attorney, Agent, or Firm* — Blakely Sokoloff Taylor & Zafman LLP

(57) ABSTRACT

A network element acts as a gateway to a data network for a subscriber end station. The network element includes control plane operable to communicate with a first network processing unit (NPU) and a second NPU, which are operable to communicate with the subscriber end station. The control plane includes a quota management module, which determines a quota amount to be assigned to the first NPU and the second NPU. The quota management module assigns a portion of the quota amount to the first NPU and another portion of the quota amount to the second NPU. The quota management module may determine to change the distribution of an unconsumed quota amount between the first NPU and the second NPU, determine the unconsumed quota amount, and assign a portion of the unconsumed quota amount to the first NPU and another portion of the unconsumed quota amount to the second NPU.

20 Claims, 8 Drawing Sheets

(56) References Cited

U.S. PATENT DOCUMENTS

| | | | |
|---|---|---|---|
| 2005/0044138 A1* | 2/2005 | Albert et al. | 709/203 |
| 2005/0078660 A1* | 4/2005 | Wood | 370/352 |
| 2005/0226249 A1* | 10/2005 | Moore | 370/395.21 |
| 2006/0041587 A1* | 2/2006 | Grubbs et al. | 707/104.1 |
| 2006/0205396 A1* | 9/2006 | Laroia et al. | 455/422.1 |
| 2007/0076807 A1* | 4/2007 | Jin et al. | 375/260 |
| 2008/0080378 A1* | 4/2008 | Kim et al. | 370/234 |
| 2008/0103861 A1* | 5/2008 | Zhong | 705/8 |
| 2008/0310437 A1* | 12/2008 | Cheng et al. | 370/404 |
| 2009/0264096 A1 | 10/2009 | Cai et al. | |
| 2009/0287768 A1* | 11/2009 | Tanaka | 709/203 |
| 2009/0304022 A1 | 12/2009 | Yang et al. | |
| 2011/0066530 A1 | 3/2011 | Cai et al. | |
| 2011/0067085 A1 | 3/2011 | Brouard et al. | |
| 2011/0158646 A1* | 6/2011 | Yuang et al. | 398/48 |
| 2011/0170455 A1 | 7/2011 | Cai et al. | |
| 2011/0171965 A1* | 7/2011 | Klein et al. | 455/450 |
| 2011/0300826 A1* | 12/2011 | Chang et al. | 455/405 |
| 2012/0092444 A1* | 4/2012 | Mackie et al. | 348/14.12 |
| 2012/0166618 A1* | 6/2012 | Dahod et al. | 709/224 |
| 2012/0276867 A1* | 11/2012 | Mcnamee et al. | 455/406 |
| 2012/0331478 A1* | 12/2012 | Zhu et al. | 718/104 |
| 2013/0084878 A1* | 4/2013 | Chen et al. | 455/452.1 |
| 2013/0290960 A1* | 10/2013 | Astete et al. | 718/1 |

OTHER PUBLICATIONS

"3GPP TS 32.240, 3rd Generation Partnership Project, Technical Specification Group Services and System Aspects, Telecommunication management, Charging management, Charging architecture and principles, (Release 11)", Sep. 2011, 45 pages, V11.1.0, 3GPP Organizational Partners.

* cited by examiner

INTELLIGENT TRAFFIC QUOTA MANAGEMENT

FIELD

Embodiments of the invention relate to traffic quota management in routing and gateway platforms. Specifically, embodiments of the invention relate to a method and device for distributing available quota amounts appropriately and efficiently between ingress and egress network processing units.

BACKGROUND

Subscribers of voice and/or data services provided by service providers utilize subscriber end stations such as mobile electronic devices to connect to the service provider's wireless or wireline network. The communication between the subscriber end station and the service provider's network occurs through one or more base stations using one or more standards or protocols, such as those defined by the 3rd Generation Partnership Project (3GPP). One current 3GPP standard for mobile subscriber end stations is Long Term Evolution (LTE), which is a wireless standard for high-speed data communication. The voice and/or data services provided by such networks are typically tracked using online charging functions to monitor the amount of various types of traffic used by each subscriber end station. Such charging functions have been presented in standards put forth by the 3GPP.

In these communication networks, a gateway, which provides the subscriber with a connection to a particular network resource, may utilize subscriber information (e.g., policy configuration information, traffic policing information, etc.) provided by an external server such as an Online Charging Server. This charging information may include information used for monitoring the subscriber's traffic consumption for policy enforcement purposes (e.g., throttle peer-to-peer traffic, throttle streaming media traffic, etc.) and/or for accounting and charging the subscriber (e.g., charging based upon the content of traffic, enforcing a quota for a type of content based upon credit assigned to the subscriber, etc.).

When a gateway is to enforce a quota for a particular traffic flow, it receives a quota amount from the external server. This quota amount represents a total amount of data that may be sent to and received from a subscriber. However, some gateways may utilize a forwarding plane containing dedicated network processing units. For example, a gateway may contain one network processing unit that only processes uplink traffic and one network processing unit that only processes downlink traffic. In such gateways, it is difficult to appropriately split the received quota amount into two portions and minimize the need to signal the external server for additional quota amounts.

SUMMARY

According to one embodiment of the invention, a network element coupled between a data network and a subscriber end station acts as a gateway to a data network for the subscriber end station and performs intelligent quota management of one or more subscriber flow quotas that monitor the amount of traffic sent between the data network and the subscriber end station. The network element includes a first network processing unit (NPU) and a second NPU that are operable to communicate with the subscriber end station. The network element also includes a control plane that is operable to communicate with the first NPU and the second NPU. The control plane includes a quota management module, which determines a quota amount associated with one of one or more traffic flows to be assigned to the first NPU and the second NPU. The quota management module also assigns a portion of the quota amount to the first NPU and another portion of the quota amount to the second NPU. The quota management module is further operable to determine to change the distribution of an unconsumed quota amount between the first NPU and the second NPU. The quota management module determines the unconsumed quota amount, and assigns a portion of the unconsumed quota amount to the first NPU and another portion of the unconsumed quota amount to the second NPU. This network element is capable to perform efficient quota distribution and redistribution between the first NPU and second NPU providing reduced internal control messaging and reduced signaling to an external policing and charging control node.

According to another embodiment of the invention, a method in a network element acting as a gateway in a communications network for intelligent quota management of a set of one or more subscriber flow quotas associated with a subscriber end station, each of the set of quotas for policing the amount of traffic travelling between the network element and the subscriber end station in one or more traffic flows, includes the step of assigning a first quota portion to a first NPU. The first quota portion is a portion of one of the set of quotas associated with one of the one or more traffic flows. The method further includes the step of assigning a second quota portion to a set of one or more other NPUs. The second quota portion is another portion of the one of the set of quotas. The method further includes the steps of determining to change the distribution of an unconsumed quota amount of the one of the set of quotas, and determining the unconsumed quota amount of the one of the set of quotas. The method further includes the step of assigning a third quota portion to the first NPU. The third quota portion is a portion of the unconsumed quota amount of the one of the set of quotas. The method further includes the step of assigning a fourth quota portion to the set of other NPUs. The fourth quota portion is another portion of the unconsumed quota amount of the one of the set of quotas. This method provides for efficient quota distribution and redistribution between a plurality of NPUs, reduced internal control messaging, and reduced signaling to an external policing and charging control node.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
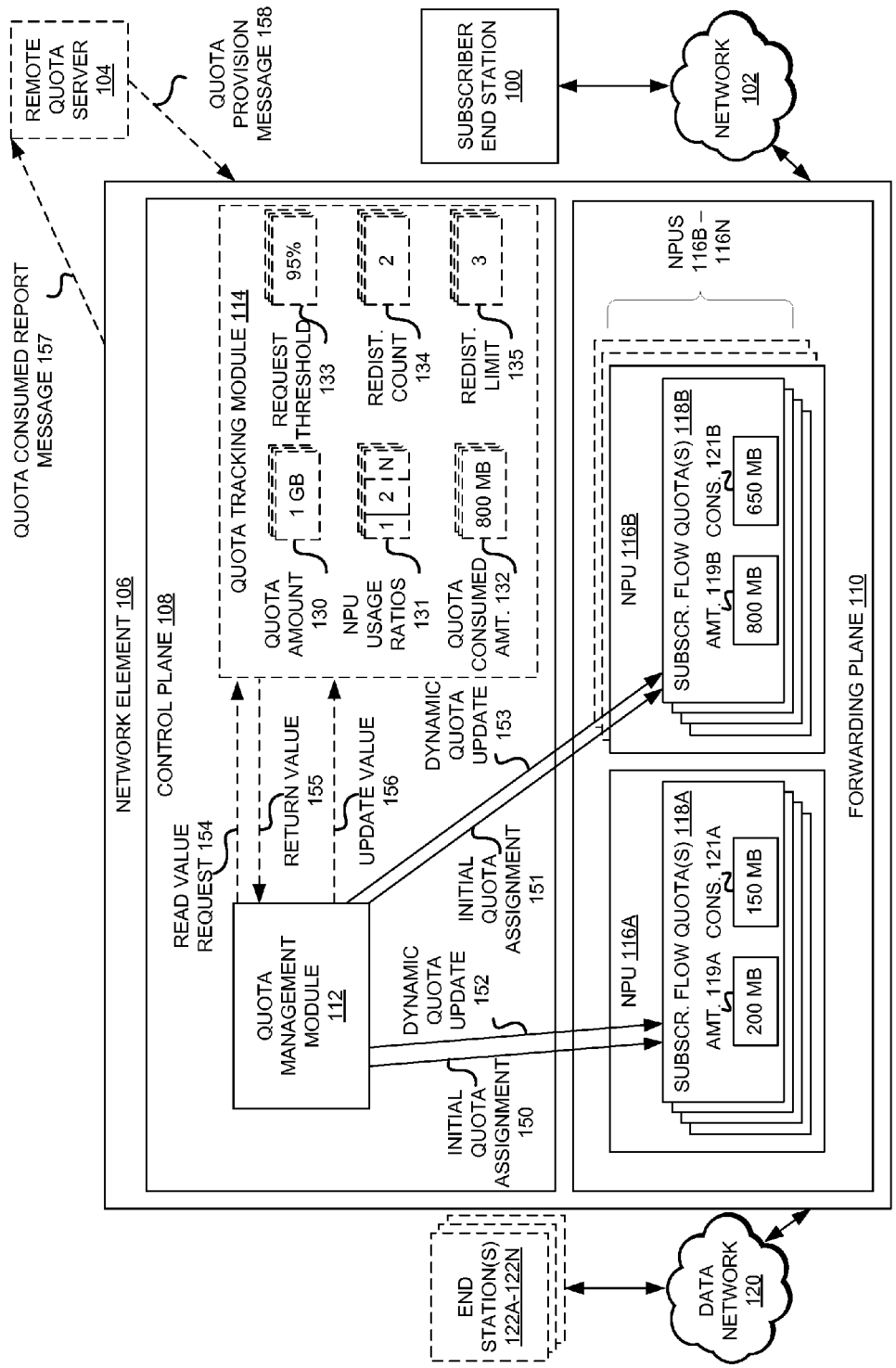
FIG. 1 illustrates an exemplary system including a network element utilizing multiple network processing units according to an embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks, optical disks, random access memory, read only memory, flash memory devices, phase-change memory) and transitory computer-readable transmission media (e.g., electrical, optical, acoustical or other form of propagated signals—such as carrier waves, infrared signals, digital signals). In addition, such electronic devices typically include a set of one or more processors coupled with one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled with an access network (wired or wirelessly)) with edge network elements, which are coupled (e.g., through one or more core network elements) with other edge network elements, which are coupled with other end stations (e.g., server end stations).

Some network elements include functionality for AAA (authentication, authorization, and accounting) protocols (e.g., RADIUS (Remote Authentication Dial-In User Service), Diameter, and/or TACAS+ (Terminal Access Controller Access Control System)). AAA can be provided through a client/server model, where the AAA client is implemented on a network element and the AAA server can be implemented either locally on the network element or on a remote end station (e.g., server end station) coupled with the network element. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network element (supporting AAA processing) coupled with core network elements coupled with server end stations of service/content providers. AAA processing is performed to identify the subscriber record for a subscriber. A subscriber record includes a set of attributes (e.g., subscriber name, password, authentication information, access control information, rate-limiting information, policing information) used during processing of that subscriber's traffic.

In wireless communication networks, such as 2G/3G and 3rd Generation Long Term Evolution/Evolved Packet Core (3G LTE/EPC) networks, similar subscriber attribute information, such as rate-limiting information and policing information, may be managed by Policy Charging and Rules Function (PCRF) nodes and/or Online Charging System (OCS) servers. In such networks, the network element may be a gateway deployed to provide data services to subscriber end stations that relies upon policy configuration or traffic policing information from an external server (e.g. OCS server, AAA server, PCRF node, etc.) to manage these data services. Examples of network elements serving as gateways include Packet Data Network Gateways (PDN-GW or PDN Gateway) in 3G LTE/EPC networks, Gateway GPRS Support Nodes (GGSN) in the packet switched domain of 2G/3G networks, and Broadband Remote Access Servers (BRAS) in wireline networks.

In a 3G LTE/EPC wireless communication network, a subscriber end station may connect to a PDN-GW to send or receive data with an external packet-switched network through an access node base station such as an eNodeB. From the eNodeB, via a S1-U interface, the connection may pass through another network element known as a serving gateway (S-GW), which routes and forwards data. The S-GW, via an S5 interface, passes the connection through to the PDN-GW, which acts as an IP point of attachment for the subscriber end station. The PDN-GW may communicate with an external server (e.g., OCS server, AAA server, PCRF node, etc.) for the purpose of obtaining policing and configuration information. This policing and configuration information may include information used for monitoring the subscriber's traffic consumption for policy enforcement purposes (e.g., to throttle peer-to-peer traffic, to throttle streaming media traffic, etc.) and for accounting and charging the subscriber based upon the content of the traffic. For example, the configuration information may require that a traffic quota be enforced on VOIP traffic of a mobile subscriber based upon credit available within the subscriber's account. Similarly, the configuration information may require that a traffic quota be policed for streaming media traffic to limit its rate of transmission. Thus, quota or volume thresholds used for charging or policing traffic flows are downloaded from the external server to the PDN-GW to be used when providing data services to the subscriber end station. Typically, a quota threshold is a number that encompasses a cumulative threshold for both uplink and downlink traffic that the PDN-GW may use while providing a particular type of data service to the subscriber end station.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Some routing and gateway network elements utilize a forwarding plane architecture that includes multiple network processing units. A network element forwarding plane may include a data card with one or more NPUs. Alternatively, a network element forwarding plane may include more than one data card, each having one or more NPUs. Commonly, such systems use separate directional processing units, wherein one or more dedicated ingress NPUs process uplink traffic from subscribers and one or more dedicated egress NPUs process downlink traffic to the subscribers. In other network elements, the multiple packet processing units need not be dedicated to only ingress or egress traffic; each may process both ingress and egress traffic. However, when receiving traffic management information from an external server (e.g., AAA server, OCS server, PCRF node, etc.), the gateway is assigned a particular quota amount for a particular flow of traffic for a subscriber. This quota amount is a single amount of traffic allowed to be utilized by the subscriber for the flow of traffic for both ingress and egress traffic. Thus, it is important to continually track the subscriber's ingress and egress traffic usage across all NPUs to note if and when the quota amount is exceeded. In gateways utilizing an architecture including multiple processing units within the forwarding plane, tracking the subscriber's ingress and egress traffic usage is difficult because of the continual need for communication between each NPU and the control plane to report upon the different types and amounts of traffic used.

One mechanism for splitting a received quota amount between NPUs involves splitting the quota amount into two portions according to a predicted usage ratio between uplink and downlink traffic and assigning each portion to a corresponding NPU. Then, when one of the NPUs exhausts its portion of the quota amount, the gateway will signal the remote server for additional quota. However, in this approach, the gateway performs inefficiently as it must frequently signal the external server to request new quota and then wait for responses from the external server.

The embodiments of the present invention provide a method and apparatus to manage the assignment of quota amounts between NPUs in a multiple NPU architecture forwarding plane by intelligently allocating and reallocating quota amounts between NPUs to minimize internal control messaging between the control plane and the forwarding plane and to minimize signaling between the control plane and external quota-granting servers.

Additionally, some of the following embodiments may be described as including a network element with two NPUs, and other embodiments may be described as including a network element with more than two NPUs. Unless indicated otherwise, the following configurations and techniques are applicable to both types of embodiments, and a configuration or technique described for one of the embodiments could be adapted to work with the other embodiment.

FIG. 1 illustrates an exemplary system including a network element 106 utilizing multiple network processing units according to one embodiment of the invention. A subscriber end station 100 is communicatively coupled with the network element 106 through a network 102, which in one embodiment may be a 3G LTE network. In other embodiments, the network 102 may be another type of wireless network (e.g. WiMAX, TDMA-based, etc.) or a wired network. The connection between the subscriber end station 100 and network element 106 occurs to allow the subscriber end station 100 to communicate with one or more end stations 122A-122N accessible to the network element 106 across a data network 120. In an embodiment, the data network 120 is an external packet data network such as the Internet.

The network element 106 contains both a control plane 108 as well as a forwarding plane 110 (also known as a data plane). The forwarding plane 110 is a multiple NPU architecture forwarding plane 110 in that it includes a first NPU 116A and a second NPU 116B. In an embodiment, one of these NPUs 116A-116B may serve as an egress processor and the other may serve as an ingress processor. It is also possible, in another embodiment, to have the first NPU 116A and the second NPU 116B each process both ingress and egress traffic. Further, in some embodiments, the forwarding plane 110 may have more than two NPUs (e.g. 116A-116N), where an NPU may be a separate directional forwarding processor (exclusively processing egress traffic, or exclusively processing ingress traffic) or a dual-directional forwarding processor (processing both egress and ingress traffic).

The subscriber end station 100 transmits a service data request to the network element 106 through the network 102. The service data request is a request to send data to or receive data from an end station (e.g. 122A) using the data network 120. If this request from the subscriber end station 100 is the first request requiring connectivity to the data network 120, the network element 106 creates a subscriber session. In another embodiment, at the time a subscriber end station 100 connects to the network 102, before any request for data network 120 connectivity, the network element 106 creates a subscriber session. At or after the time the subscriber session is created on the network element 106, a remote quota server 104 assigns the subscriber session a quota amount 130 for one or more traffic flows via a quota provision message 158. This provisioned quota amount 130 is an amount of data for a particular flow that can be sent or received through the network element 106 by the subscriber end station 100. The quota amount 130 is stored by a quota tracking module 114, which maintains various statistics regarding subscriber flows.

Upon receipt of the quota provision message 158 and determination of the quota amount 130 for a flow, the quota management module 112 performs an initial quota assignment 150 to a first NPU (e.g. 116A). This initial quota assignment 150 contains a quota amount 119A, which is a portion of the quota amount 130 signifying an amount of traffic that the first NPU 116A may utilize for a particular subscriber flow. This quota amount 119A is stored by the first NPU 116A as part of a subscriber flow quota 118A. Similarly, this quota assignment also occurs for other NPUs within the forwarding plane 110. For example, the quota management module 112 also makes an initial quota assignment 151 to a second NPU (e.g. 116B), which stores the portion of the quota amount 130 communicated in the initial quota assignment 151 as a subscriber flow quota 118B quota amount 119B.

In this manner, the network element 106 is enabled to perform the network forwarding necessary for the service data request generated by the subscriber end station 100. As an example, when the first NPU 116A is configured as a dedicated ingress NPU to process uplink traffic, the first NPU 116A will forward the service data request to the data network 120. In forwarding this request, the first NPU 116A will note the amount of data forwarded and increment the consumed amount 121A of the subscriber flow quota 118A that the service data request is associated with. Thus, the first NPU 116A maintains a record of the assigned quota amount 119A and the consumed amount 121A of the subscriber flow quota 118A. Similarly, with the second NPU 116B configured as a dedicated egress NPU to process downlink traffic, when the network element 106 receives the service data request's return traffic data from an end station (e.g. 122A), the second NPU 116B will forward the data to the subscriber end station 100 using the network 102 and increment a consumed amount 121B of the subscriber flow quota 118B according to the amount of return traffic data.

When the network element 106 receives a quota amount 130 as part of a quota provision message 158 from a remote quota server 104, the quota management module 112 must determine how to initially distribute the quota amount 130 between the first NPU 116A and second NPU 116B. One way to split the data is according to a defined ratio set in the quota management module 112. In one embodiment, this defined ratio is based upon a common case illustrated by a user traffic model: frequent traffic usage observed in 3G LTE networks is approximately 20% uplink traffic and 80% downlink traffic. Thus, an initial split using this user model 20:80 ratio will assign 20% of the quota amount 130 to ingress NPUs and 80% of the quota amount 130 to egress NPUs.

For example, the network element 106 of FIG. 1 illustrates an initial quota assignment according to the 20:80 defined ratio with one ingress NPU 116A and one egress NPU 116B. In this example, the remote quota server 104 assigns the network element 106 a total of one gigabyte (1 GB) of quota amount 130 for a particular subscriber flow via a quota provision message 158. Using the 20:80 defined ratio, the quota management module 112 assigns the first NPU 116A a subscriber flow quota 118A quota amount 119A of two hundred megabytes (200 MB) of traffic, which is 20% of the 1 GB quota amount 130. Similarly, using the 20:80 defined ratio, the quota management module 112 assigns the second NPU 116B a subscriber flow quota 118B amount 119B of eight hundred megabytes (800 MB) of traffic, which is 80% of the 1 GB quota amount 130.

In another embodiment, the defined ratio used to split the quota amount 130 is based upon a historic NPU usage ratio. The historic NPU usage ratio indicates a ratio of ingress traffic to egress traffic consumed during previous communications between the network element 106 and the subscriber end station 100. This ratio may further be limited to including only traffic from communications for the same subscriber flow that the quota amount to be apportioned is associated with. For example, if the quota amount 130 to be split is for a flow of VoIP traffic, the ratio may be based upon the user's previous amount of VoIP ingress and egress traffic usage. A benefit of using defined ratios that approximate anticipated levels of ingress and egress usage for a flow when splitting the quota amount 130 is increased system efficiency. In a forwarding plane 110 with two NPUs (e.g. 116A-116B), if each NPU is assigned a portion of the quota amount in proportion to the amount each will likely use in a given time period, it is likely that both of the NPUs will consume their assigned quota amounts at approximately the same time. This situation is preferred to a scenario where a first NPU (e.g. 116A) consumes its quota amount far before a second NPU (e.g. 116B). In this scenario, the first NPU 116A must be replenished with additional quota, which requires additional signaling and action on the part of the quota management module 112. However, if the quota amount was divided between the two NPUs in a proportion more closely linked to the actual usage proportion, the NPUs would be able to operate longer without running out of quota. Additionally, if the initial quota assignment is more closely aligned with the actual usage proportion, there will only be one exchange between the NPUs and the quota management module for a single quota, which is more efficient and may allow the system to scale to handle more subscribers.

As the network element 106 continues to serve the subscriber end station 100 by providing access to the data network 120, one of the NPUs (e.g. 116A) will consume a significant portion of its subscriber flow quota amount 119A. At this point, the NPU 116A will signal the quota management module 112 using a quota exhausted message, and may reset its quota consumed amount 121A back to 0. In an embodiment, the significant portion of the quota amount 119A is the entirety of the quota amount 119A, but other embodiments may cause a quota exhausted message to be sent earlier, such as when a particular percentage (e.g. 75%, 90%, etc.) of the quota amount 119A is consumed. In an embodiment, the quota exhausted message will include a value representing the portion of the quota amount that has been consumed. For example, if NPU 116A were to send a quota exhausted message in such an embodiment, the quota exhausted message would include the consumed amount 121A of the subscriber flow quota 118A (e.g. 150 MB, which is 75% of the quota amount 119A of 200 MB).

Upon receipt of a quota exhausted message from a first NPU 116A, the quota management module 112 determines how much of the quota amount 130 is remaining, or unconsumed, within the NPUs in the forwarding plane 110. The quota management module 112 assigns a portion of this unconsumed quota amount to a first NPU 116A through a dynamic quota update 152, and assigns another portion of this unconsumed quota amount to the second NPU 116B through another dynamic quota update 153.

Additionally, upon receipt of a quota exhausted message from an NPU, the quota management module 112 may signal a remote quota server 104. In an embodiment, the quota management module 112 sends a quota consumed report message 157 to the remote quota server 104 to report the quota consumed amount 132, which is an amount of the quota amount 130 that has been consumed by the NPUs. Upon receipt of a quota consumed report message 157, the remote quota server 104 may be configured to grant an additional quota amount for the subscriber flow to the network element 106 with a quota provision message 158, provided that the subscriber is allowed to consume additional quota. In another embodiment, the quota management module 112 may send a subscriber quota request message to the remote quota server 104 to explicitly ask for an additional quota amount for the subscriber flow.

The quota management module 112 may maintain information about subscriber flows in an optional quota tracking module 114. This quota tracking module 114 may be accessed by the quota management module 112 via a read value request, and the quota tracking module 114 will send back a requested value with a return value message 155. The quota management module 112 is also operable to update a value in the quota tracking module 114 using an update value 156 message.

The determination by the quota management module 112 regarding how to split the remaining quota amount between the NPUs may occur through the use of the information maintained by the quota tracking module 114. For example, when a received quota provision message 158 assigns an amount of quota for a subscriber flow, the quota management module 112 caches this value as a quota amount 130 in the quota tracking module 114. When an NPU signals the quota management module 112 with a quota exhausted message and the quota management module 112 calculates an unconsumed quota amount, the quota management module 112 further calculates and stores a quota consumed amount 132 within the quota tracking module 114. Similarly, the quota management module 112 may also note the portions of the quota amount that each NPU in the forwarding plane 110 has consumed in relation to the portions consumed by the other one or more NPUs, and store representations of these as NPU usage ratios 131 within the quota tracking module 114.

For example, when a subscriber end station 100 first becomes communicatively coupled with the network element 106, the remote quota server 104 assigns the subscriber session a total of 1 GB of traffic data through a quota provision message 158. The quota management module 112 records this 1 GB within the quota tracking module 114 as a quota amount 130 and makes an initial quota assignment 150 (e.g. 200 MB) to a first NPU 116A and an initial quota assignment 151 (e.g. 800 MB) to a second NPU 116B. As the network element 106 processes the service data request and subsequent service data requests, quota will be consumed by the first NPU 116A and/or the second NPU 116B. At some point, according to configured settings specifying when an NPU should send a quota exhausted message, the second NPU 116B sends a quota exhausted message to the quota management module 112 indicating that of its assigned 800 MB of quota amount 119B, its quota consumed 121B amount is 650 MB. At this point, the second NPU 116B may also reset its quota consumed amount 121B back to 0. In response, the quota management module 112 queries the first NPU 116A to determine how much of its assigned 200 MB of quota amount 119A that it consumed. The first NPU 116A will report that it consumed 150 MB as its quota consumed amount 121A. With these values, the quota management module 112 determines that of the 1 GB of quota amount 130 for this subscriber flow, 800 MB has been consumed, which will be stored as the quota consumed amount 132, and that 200 MB is an unconsumed quota amount. Further, the quota management module 112 may calculate that the first NPU 116A has consumed 18.75% of the quota consumed amount 132, and store a representation of this percentage as an NPU usage ratio 131. Similarly, the quota management module 112 may calculate that the second NPU 116B has consumed 81.25% of the quota consumed amount 132, and also store a representation of this percentage as an NPU usage ratio 131.

When determining how to redistribute unconsumed quota, the quota management module 112 may utilize similar splitting methods as those used during the initial quota assignment. For example, the quota management module 112 may split the unconsumed quota amount using a defined ratio (e.g. according to a user traffic model, 20:80, etc.) or using a historic NPU usage ratio.

Alternatively, the quota management module 112 may use the NPU usage ratios 131 tracked in the quota tracking module 114 to determine what portions of the unconsumed quota amount will be redistributed to each of the NPUs 116A-116B. Continuing the example with 200 MB of unconsumed quota, the quota management module 112 will assign the first NPU 116A a portion according to the first NPU's 116A NPU usage ratio 131 (e.g. 18.75%). Thus, the quota management module 112 will assign the first NPU 116A a quota amount 119A of 37.5 MB (18.75% of 200 MB) through a dynamic quota update 152. Similarly, the quota management module 112 will assign the second NPU 116B a quota amount 119B of 162.5 MB (81.25% of 200 MB) through a dynamic quota update 153. This method of redistributing quota between NPUs is very efficient as each NPU is granted a portion of unconsumed quota in proportion to how much it has recently used compared to the one or more other NPUs in the forwarding plane. By assuming the future need for ingress and egress traffic will be similar to the recent need for ingress and egress traffic as indicated by the NPU usage ratios 131, the system is able to make an empirical estimation of the ratio of quota that should be assigned to the NPUs to allow each to continue processing data for the flow as long as possible before any NPU will exhaust its assigned quota amount.

In a system having exactly two NPUs 116A-116B, the quota tracking module 114 may be configured to only store one NPU usage ratio 131 for one of the NPUs, as the other can be easily derived. For example, if the first NPU 116A consumes 30% of the quota amount in a two NPU system, only this value needs to be stored, as the ratio for the second NPU 116B may be derived using simple subtraction to be 70% (i.e. 100−30=70). However, in a system with more than two NPUs, the quota tracking module 112 would need to keep representations of the ratio for each NPU to be able to redistribute quota using the NPU usage ratios 131 in this manner. Alternatively, in an embodiment, the NPU usage ratios 131 track only one ratio per flow, which is a ratio of ingress to egress traffic. In this case, the quota management module 112 would assign a portion of the ingress portion of the unconsumed quota amount to each ingress NPU in the forwarding plane 110, and similarly assign a portion of the egress portion of the unconsumed quota amount to each egress NPU in the forwarding plane 110.

The quota tracking module 114 may also be operable to store a request threshold 133, which can be used by the quota management module 112 in determining when to signal the remote quota server 104. This request threshold 133 may be associated for all subscriber flows on the network element 106 or may be associated with one or more subscriber flows, and represents a percentage of a provisioned quota amount 130 that, when consumed by the NPUs, indicates a need to signal the remote quota server 104. Thus, when the quota management module 112 receives a quota exhausted message from an NPU and updates the quota consumed amount 132 for the flow, it will determine if the quota consumed amount 132 divided by the quota amount 130 (which is a quota consumed percentage value) is greater than the request threshold 133. If so, the quota management module 112 will signal the remote quota server 104. In another embodiment, the request threshold 133 is not a ratio of quota consumption but is instead an amount of data (e.g. in bytes, kilobytes, etc.) to be consumed. Thus, when the quota consumed amount 132 first equals or exceeds the request threshold 133, the quota management module 112 will signal the remote quota server 104.

Similarly, in an embodiment the quota tracking module 114 is operable to manage a redistribution count 134 and a redistribution limit 135. In an embodiment, the redistribution limit 135 is defined for all subscriber flows managed by the network element 106. This redistribution limit 135 represents a number of times that unconsumed quota should be redistributed between the NPUs since the provisioned quota amount 130 was assigned in a quota provision message 158 before signaling the remote quota server 104. Similarly, the redistribution count 134 keeps track of the number of times that unconsumed quota has been redistributed between the NPUs since the quota amount 130 was originally assigned in a quota provision message 158. In an embodiment, when the redistribution count 134 equals the redistribution limit 135, the quota management module 112 signals the remote quota server 104.

In an embodiment, a quota management module 112 is operable to implement both a request threshold 133 and a redistribution limit 135 simultaneously. In such a configuration, when either the quota consumed percentage value exceeds the request threshold 133 or the redistribution count 134 equals the redistribution limit 135, the quota management module 112 will signal the remote quota server 104.

In an embodiment, when the quota management module 112 signals the remote quota server 104 the quota management module 112 will no longer redistribute quota upon receipt of a quota exhausted message from any NPU until an additional provisioned quota amount is assigned by the remote quota server 104 in a quota provision message 158. This configuration provides a benefit of reduced internal signaling between the forwarding plane 110 and the control plane 108. In an embodiment, each NPU will be made aware of the signal to the remote quota server 104 and will not send quota exhausted messages until the NPUs are assigned additional quota when the quota management module 112 receives an additional provisioned quota amount. Similarly, this embodiment also provides a benefit of eliminating signaling between the forwarding plane 110 and the control plane 108 regarding the quota while the system awaits additional quota.

To illustrate this benefit, consider the alternate scenario where the quota management module 112 would always continue to redistribute quota to two NPUs 116A-116B. After some time redistributing unconsumed quota amounts, the quota management module 112 would calculate a very small unconsumed quota amount and split this very small amount into two even smaller portions. The first small portion would be assigned to a first NPU 116A and the second small portion would be assigned to a second NPU 116B. In a very short period of time, one of the NPUs (e.g. 116A) would consume its assigned first small portion of quota very quickly and send a quota exhausted message to the quota management module 112. This would trigger the quota management module 112 to signal the second NPU 116B, receive a response from the second NPU 116B, and use the response to calculate an even smaller unconsumed quota amount. This unconsumed quota amount would again be split into even smaller portions for the NPUs 116A-116B. With the NPUs 116A-116B receiving smaller and smaller portions of quota, the exhaustion-redistribution cycle would intensify in frequency, potentially leading to an overwhelming amount of signaling between the control plane 108 and the forwarding plane 110.

In an embodiment, when the quota management module 112 has signaled the remote quota server 104 and refuses to redistribute unconsumed quota because the remote quota server 104 has not yet sent an additional provisioned quota amount, the quota management module 112 may allow each NPU that exhausts its assigned quota amount to continue processing extra traffic for the flow, and then deduct this extra traffic usage from any future provisioned quota amount received from the remote quota server 104. In this configuration, the subscriber will not notice any interruption of service caused by an NPU pausing the processing of traffic while it waits for additional quota. However, if the remote quota server 104 determines that the subscriber flow is not allowed additional quota and signals the forwarding element to stop providing service, the subscriber may receive the benefit of some "free" service before such a message is received. In another embodiment, instead of continuing processing, the NPUs may be configured to stop processing any traffic. In this approach, the subscriber may notice an interruption of service, but the subscriber is prevented from ever gaining any "free" service.

The operations of the flow diagrams in FIGS. 2-5 and 7 will be described with reference to the exemplary embodiment of FIG. 1. However, it should be understood that the operations of flow diagrams can be performed by embodiments of the invention other than those discussed with reference to FIG. 1, and the embodiments discussed with reference to FIG. 1 can perform operations different than those discussed with reference to the flow diagrams of FIGS. 2-5 and 7.

Figure 2:
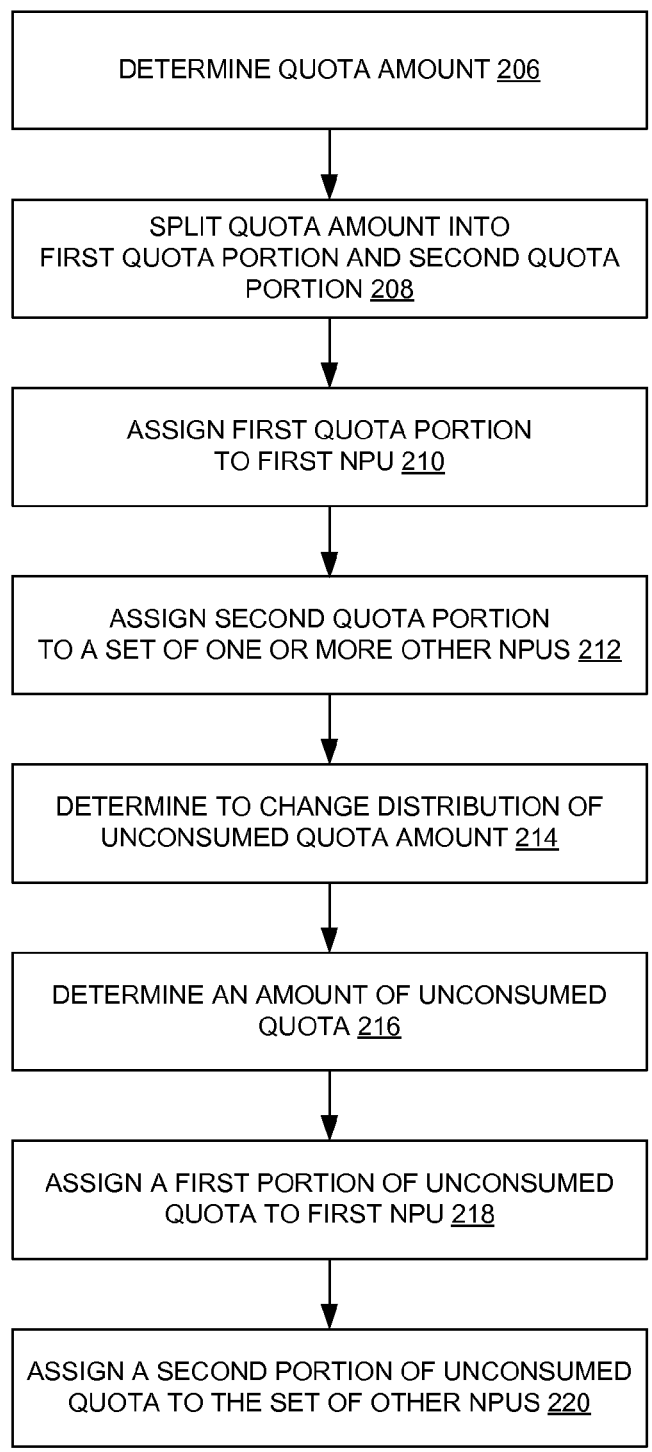
FIG. 2 illustrates a flow diagram of a method in a network element for assigning and redistributing quota between a set of network processing units according to an embodiment of the invention.

FIG. 2 illustrates a flow diagram of a method in a network element for assigning and redistributing quota between a set of network processing units for a subscriber flow according to an embodiment of the invention. In block 206, the quota management module 112 determines a quota amount 130. In an embodiment, a provisioned quota amount 130 arrives as part of a quota provision message 158 from a remote quota server 104. In block 208, the quota amount 130 is split into a first quota portion and a second quota portion. In an embodiment, this split occurs according to a defined ratio; in other embodiments, this split occurs according to a historic NPU usage ratio indicating a ratio of ingress traffic to egress traffic consumed during all previous communications between the network element 106 and the subscriber end station 100 for a particular subscriber flow. In block 210, the first quota portion is assigned to a first NPU (e.g. 116A), and in block 212 the second quota portion is assigned to a set of one or more other NPUs (e.g. 116B-116N). In an embodiment where the forwarding plane 110 includes exactly two NPUs (e.g. 116A-116B), the second quota portion is simply the difference between the first quota portion and the quota amount 130. In another embodiment where the forwarding plane 110 has more than two NPUs (e.g. 116A-116N), the second quota portion may further be split into two or more portions, each of which to be assigned to an NPU. In block 214, the quota management module 112 is to determine to change the distribution of an unconsumed quota amount. In an embodiment of the invention, the determination occurs as a result of the quota management module 112 in the control plane 108 receiving a quota exhausted message from an NPU (e.g. 116A) in the forwarding plane. In block 216, the quota management module 112 determines an amount of unconsumed quota. In an embodiment, the quota management module 112 sends a quota consumed query message to each NPU (e.g. 116B-116N) that did not send the quota exhausted message, causing the quota management module 112 to determine to change the distribution of an unconsumed quota amount. In response to receipt of the quota consumed query message, each recipient NPU (116B-116N) sends a notification to the quota management module 112 indicating how much quota it consumed or did not consume. With this information, the quota management module 112 is then able to calculate how much of the quota amount 130 remains unconsumed. In block 218, the quota management module 112 assigns a first portion of the unconsumed quota amount to a first NPU 116A. In one embodiment, the quota management module 112 determines a first portion of the unconsumed quota amount using an NPU usage ratio 131 for the first NPU 116A, where the NPU usage ratio 131 indicates what percentage of quota for the subscriber flow has been consumed by the first NPU 116A. The first portion of the unconsumed quota amount is calculated to be the percentage of the unconsumed quota amount indicated by the first NPU's 116A corresponding NPU usage ratio 131. In block 220, the quota management module 112 assigns a second portion of the unconsumed quota amount to the set of other NPUs 116B-116N. In an embodiment with exactly two NPUs in the forwarding plane 110, the second portion of the unconsumed quota amount is calculated to be the difference between the unconsumed quota amount and the first portion of the unconsumed quota amount. In another embodiment with more than two NPUs in the forwarding plane 110, the quota management module 112 assigns the second portion of the unconsumed quota amount by dividing a portion of the unconsumed quota amount into smaller portions and assigning these smaller portions to the remaining NPUs 116B-116N. This may occur by calculating an NPU-specific portion of the unconsumed quota amount for each NPU in the set of other NPUs 116B-116N according to each NPU's usage ratio 131, and then assigning each NPU-specific portion to the corresponding NPU.

Figure 3:
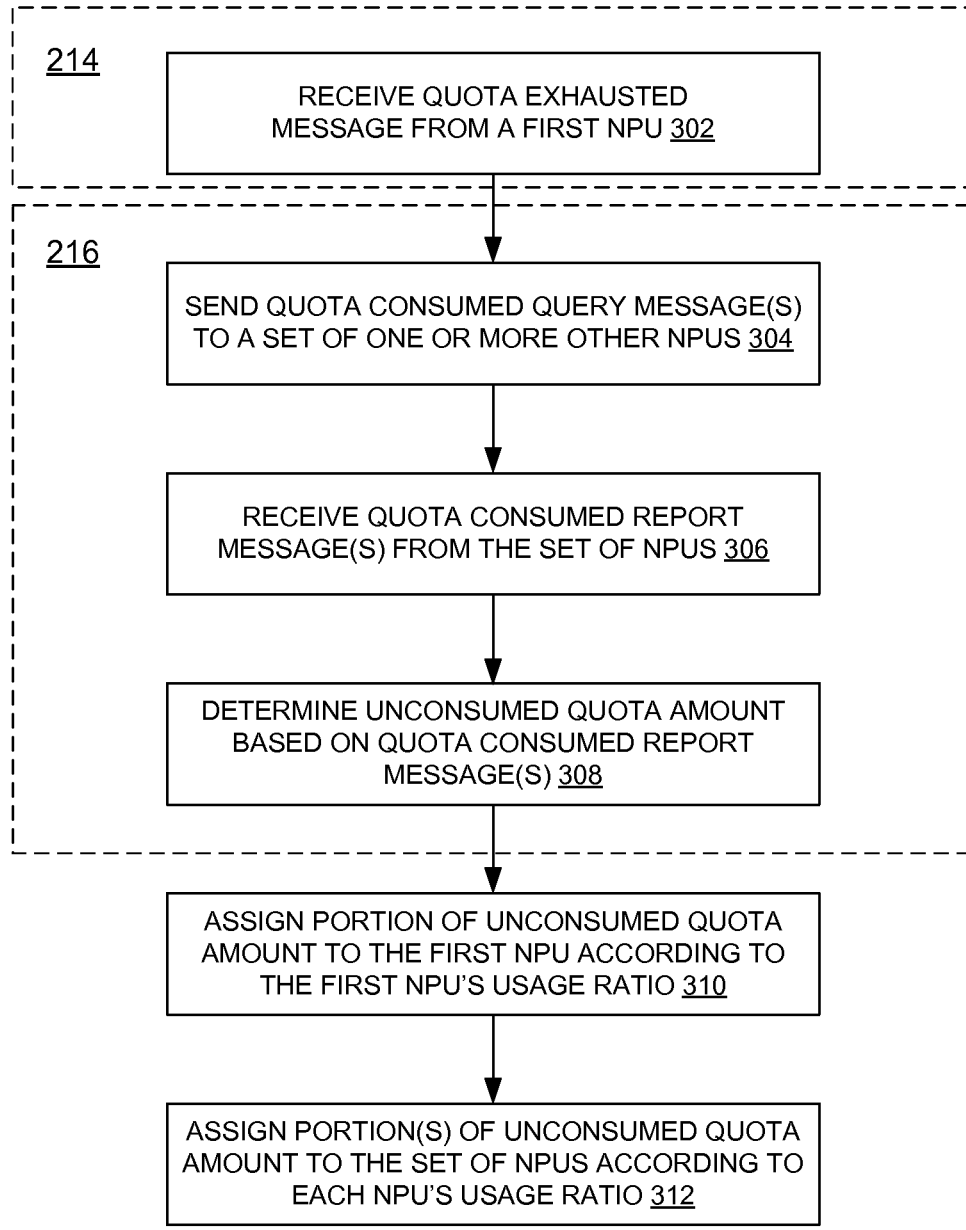
FIG. 3 illustrates a flow diagram of a method in a network element for determining an unconsumed quota amount according to an embodiment of the invention.

FIG. 3 illustrates a flow diagram of a method in a network element for determining an unconsumed quota amount according to an embodiment of the invention. Block 302 represents one embodiment of block 214, which encompasses the step of determining to change the distribution of an unconsumed quota amount. In this embodiment, the determination occurs when the quota management module 112 in the network element 106 receives a quota exhausted message from a first NPU (e.g. 116A) in the forwarding plane 110. In an embodiment, the quota exhausted message indicates that the first NPU 116A has consumed its entire portion of assigned quota, but in other embodiments the quota exhausted message may simply indicate that the first NPU 116A has consumed an amount of its assigned quota.

Blocks 304, 306, and 308 represent an embodiment of block 216, which encompasses the step of determining an amount of unconsumed quota for a subscriber flow. In block 304, the quota management module 112 sends a quota consumed query message to a set of one or more other NPUs (e.g. 116B-116N), where each message indicates a request for each NPU to report how much of their assigned quota for the flow they have consumed. In block 306, the quota management module 112 receives quota consumed report messages from the set of NPUs 116B-116N. In an embodiment, upon receipt of a quota consumed query message from the quota management module 112, an NPU sends a quota consumed report message back to the quota management module 112 including the NPU's consumed amount of its assigned portion of the subscriber flow quota amount. Thus, after sending quota consumed query messages to the set of NPUs 116B-116N in block 304, each NPU in the set will respond to the quota management module 112 with a quota consumed report message. In block 308, the quota management module 112 determines the unconsumed quota amount based at least on the received quota consumed report messages in block 306. In an embodiment, the quota management module 112 determines the unconsumed quota amount by calculating the difference between the quota amount 130 and a quota consumed amount 132, which is calculated using all consumed amounts from the received quota consumed query messages and the consumed amount indicated by the quota exhausted message from the first NPU 116A.

In block 310, the quota management module 112 assigns a portion of the unconsumed quota amount to the first NPU 116A according to the first NPU's usage ratio 131. In an embodiment, the quota management module 112 maintains NPU usage ratios 131 for each NPU in the forwarding plane 110 using the quota tracking module 114, each NPU usage ratio 131 indicating the portion of the quota amount 130 that the corresponding NPU has consumed. The quota management module 112 will perform a dynamic quota update 152 of the first NPU 116A by assigning it a portion of the unconsumed quota amount in proportion to the NPU usage ratio 131 for the first NPU 116A. In block 312, the quota management module 112 assigns one or more portions of the unconsumed quota amount to the set of NPUs 116B-116N according to the NPU usage ratio 131 for each NPU in the set. In an embodiment where the forwarding plane 110 contains exactly two NPUs (e.g. 116A-116B), the NPU usage ratio 131 for the second NPU 116B may be explicitly stored or derived, as the second NPU usage ratio 131 is equal to the difference between the number one and the first NPU's 116A NPU usage ratio 131. For example, if the first NPU's 116A NPU usage ratio 131 is 0.55, then the second NPU's 116B NPU usage ratio 131 may be derived as equal to one minus 0.55, or 0.45. In an embodiment, an NPU in the set of NPUs 116B-116N is assigned a quota amount based upon the unconsumed quota amount multiplied by the corresponding NPU's NPU usage ratio 131.

Figure 4:
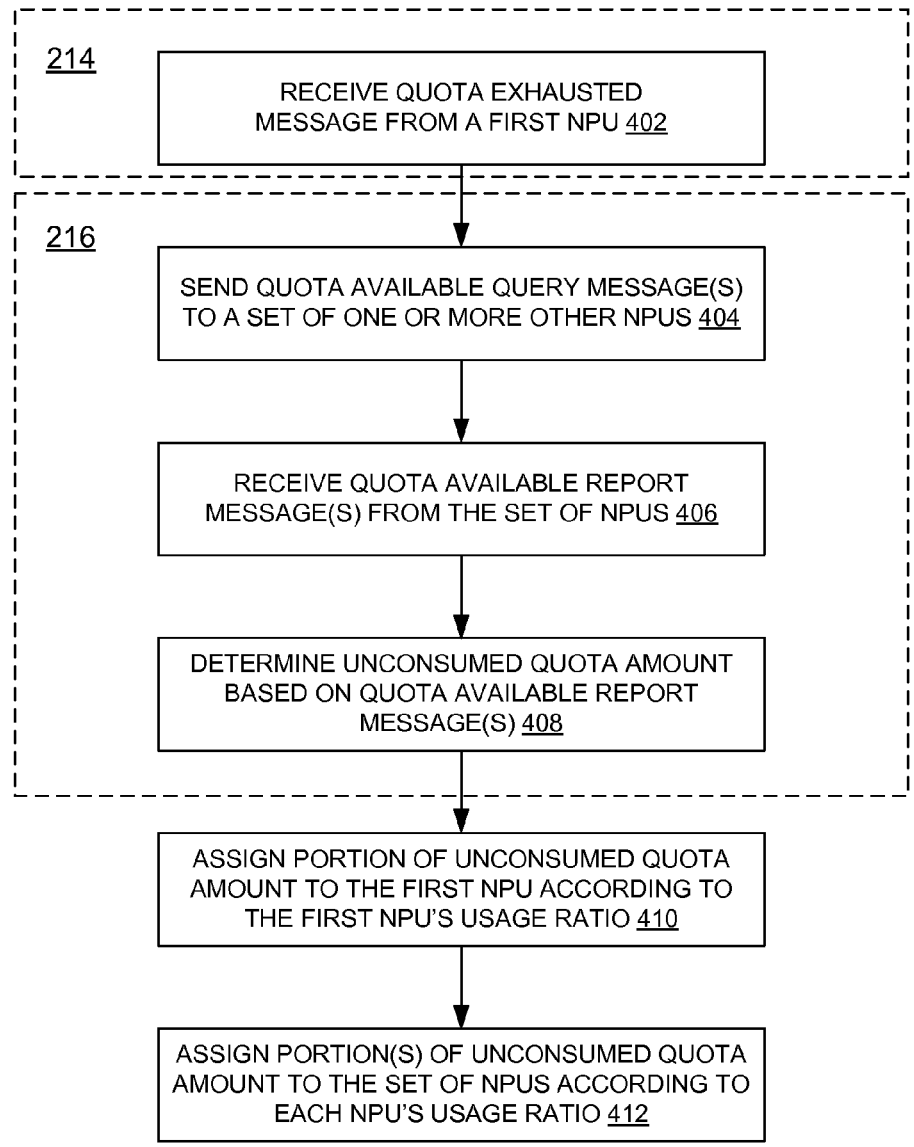
FIG. 4 illustrates a flow diagram of a method in a network element for determining an unconsumed quota amount according to an embodiment of the invention.

FIG. 4 illustrates a flow diagram of a method in a network element for determining an unconsumed quota amount according to an embodiment of the invention. The flow of FIG. 4 differs from the flow of FIG. 3 at least in that it determines an amount of unconsumed quota for a subscriber flow differently. Block 402 represents one embodiment of block 214, as the quota management module 112 determines to change the distribution of an unconsumed quota amount by receiving a quota exhausted message from a first NPU (e.g. 116A).

Blocks 404, 406, and 408 represent an embodiment of block 216, which encompasses the step of determining an amount of unconsumed quota for a subscriber flow. In block 404, the quota management module 112 sends a quota available query message to a set of one or more other NPUs (e.g. 116B-116N), which indicates a request for each NPU 116B-116N to report how much of their assigned quota for the flow that has not been consumed. In block 406, the quota management module 112 receives quota available report messages from the set of NPUs 116B-116N. In an embodiment, upon receipt of a quota available query message from the quota management module 112, an NPU sends a quota available report message back to the quota management module 112 including an available amount, which is the NPU's unconsumed amount of its assigned portion of the subscriber flow quota amount. In one embodiment, an NPU (e.g. 116B) determines this unconsumed amount of its assigned portion of the subscriber flow quota amount by calculating the difference between its assigned quota amount 119B and its consumed amount 121B. After sending quota available query messages to the set of other NPUs 116B-116N in block 404, each NPU in the set will respond to the quota management module 112 with a quota available report message. In block 408, the quota management module 112 determines the unconsumed quota amount based on the received quota available report messages in block 306. In an embodiment where a quota exhausted message indicates a NPU (e.g. 116A) has consumed its entire assigned quota amount, the quota management module 112 determines the unconsumed quota amount by calculating the sum of all available amounts (e.g. 119B-119N) from the received quota available query messages. In an embodiment where a quota exhausted message does not mean the NPU (e.g. 116A) has consumed its entire assigned quota amount, the quota management module 112 determines the unconsumed quota amount by calculating the sum of all available amounts (e.g. 119B-119N) from the received quota available query messages and further adding an available amount from the first NPU 116A. In one embodiment, the quota exhausted message from the first NPU 116A includes an available amount, which is the difference between the NPU's assigned quota amount 119A and the amount of that quota that has been consumed 121A. In another embodiment, the quota exhausted message from the first NPU 116A includes a consumed amount 121A, and the quota management module 112 must calculate an available amount for the first NPU 116A by subtracting the consumed amount 121A from the quota amount 119A assigned to the first NPU 116A. In another embodiment, the quota management module 112 may determine the available amount from the first NPU 116A by further sending a quota available query message to the first NPU 116A and receiving a quota available report message back from the first NPU 116A that includes an available amount.

In block 410, the quota management module 112 assigns a portion of the unconsumed quota amount to the first NPU 116A according to the first NPU's usage ratio 131. In an embodiment, the quota management module 112 maintains NPU usage ratios 131 for each NPU in the forwarding plane 110 using the quota tracking module 114, each NPU usage ratio 131 indicating the portion of the quota amount 130 that the NPU has consumed. The quota management module 112 will perform a dynamic quota update 152 of the first NPU 116A by assigning it a portion of the unconsumed quota amount in proportion to the NPU usage ratio 131 for the first NPU 116A. In block 412, the quota management module 112 assigns one or more portions of the unconsumed quota amount to the set of NPUs 116B-116N according to the NPU usage ratio 131 for each NPU in the set. In an embodiment where the forwarding plane 110 contains exactly two NPUs (e.g. 116A-116B), the NPU usage ratio 131 for the second NPU 116B may be explicitly stored or derived, as the second NPU usage ratio 131 is equal to the difference between the number one and the first NPU's 116A NPU usage ratio 131. For example, if the first NPU's 116A NPU usage ratio 131 is 0.55, then the second NPU's 116B NPU usage ratio 131 may be derived as equal to one minus 0.55, or 0.45. In an embodiment, an NPU in the set of NPUs 116B-116N is assigned a quota amount based upon the unconsumed quota amount multiplied by the NPU's corresponding NPU usage ratio 131.

Figure 5:
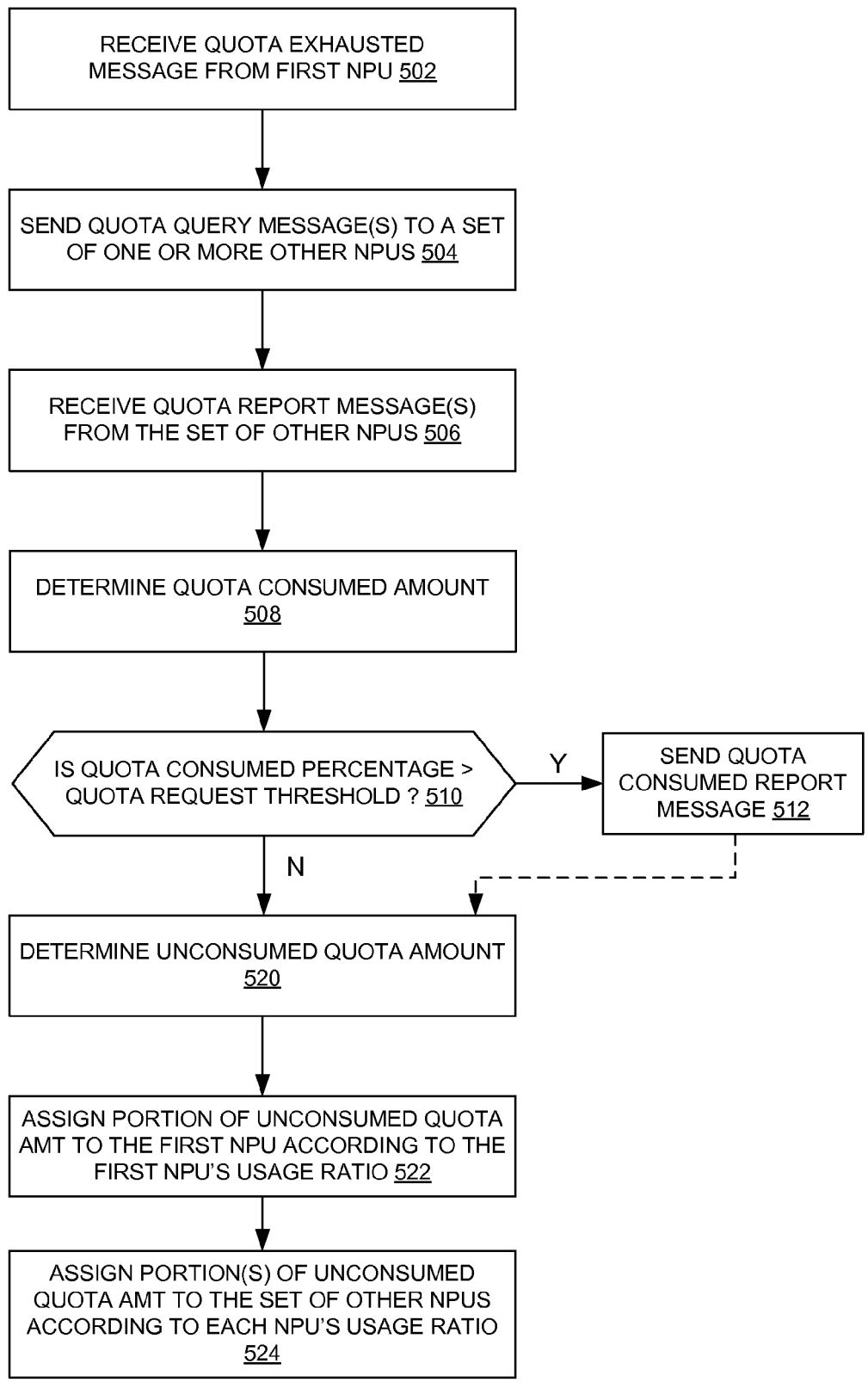
FIG. 5 illustrates a flow diagram of a method in a network element for quota redistribution according to an embodiment of the invention.

FIG. 5 illustrates a flow diagram of a method in a network element for quota redistribution according to an embodiment of the invention. In block 502, the quota management module 112 receives a quota exhausted message from a first NPU (e.g. 116A).

In response to the receipt of this quota exhausted report message, the quota management module 112 sends one or more quota query messages to each of a set of one or more other NPUs (e.g. 116B-116N) in the forwarding plane 110 as in block 504. In block 506, the quota management module 112 receives one or more quota report messages from the set of NPUs 116B-116N. In one embodiment of the invention, the one or more quota query messages are quota consumed query messages and the one or more quota report messages are quota consumed report messages. In another embodiment of the invention, the one or more quota query messages are quota available query messages and the quota report messages are quota available report messages.

In block 508, the quota management module 112 determines a quota consumed amount based on the contents of the quota report messages. A decision point is presented in block 510, wherein the quota management module 112 determines if a quota consumed percentage, which is the quota consumed amount 132 divided by the quota amount 130, is greater than a quota request threshold 133. If the quota consumed percentage is greater than the quota request threshold 133, the flow continues to block 512 and the quota management module 112 sends a quota consumed report message to a remote quota server 104. In one embodiment, the quota management module 112 will continue to block 520; in other embodiments, the quota management module 112 is configured to stop redistributing unconsumed quota until an additional provisioned quota amount is received from the remote quota server 104.

When decision block 510 evaluates to "N," or in embodiments where block 512 is to be followed by block 520, the quota management module 112 determines an unconsumed quota amount, per block 520. The quota management module 112 assigns a portion of the unconsumed quota amount to the first NPU 116A according to the first NPU's 116A corresponding NPU usage ratio 131, as described in block 522. In block 524, the quota management module 112 assigns one or more portions of the unconsumed quota amount to the set of other NPUs 116B-116N according to each NPU's corresponding usage ratio 131.

Figure 6:
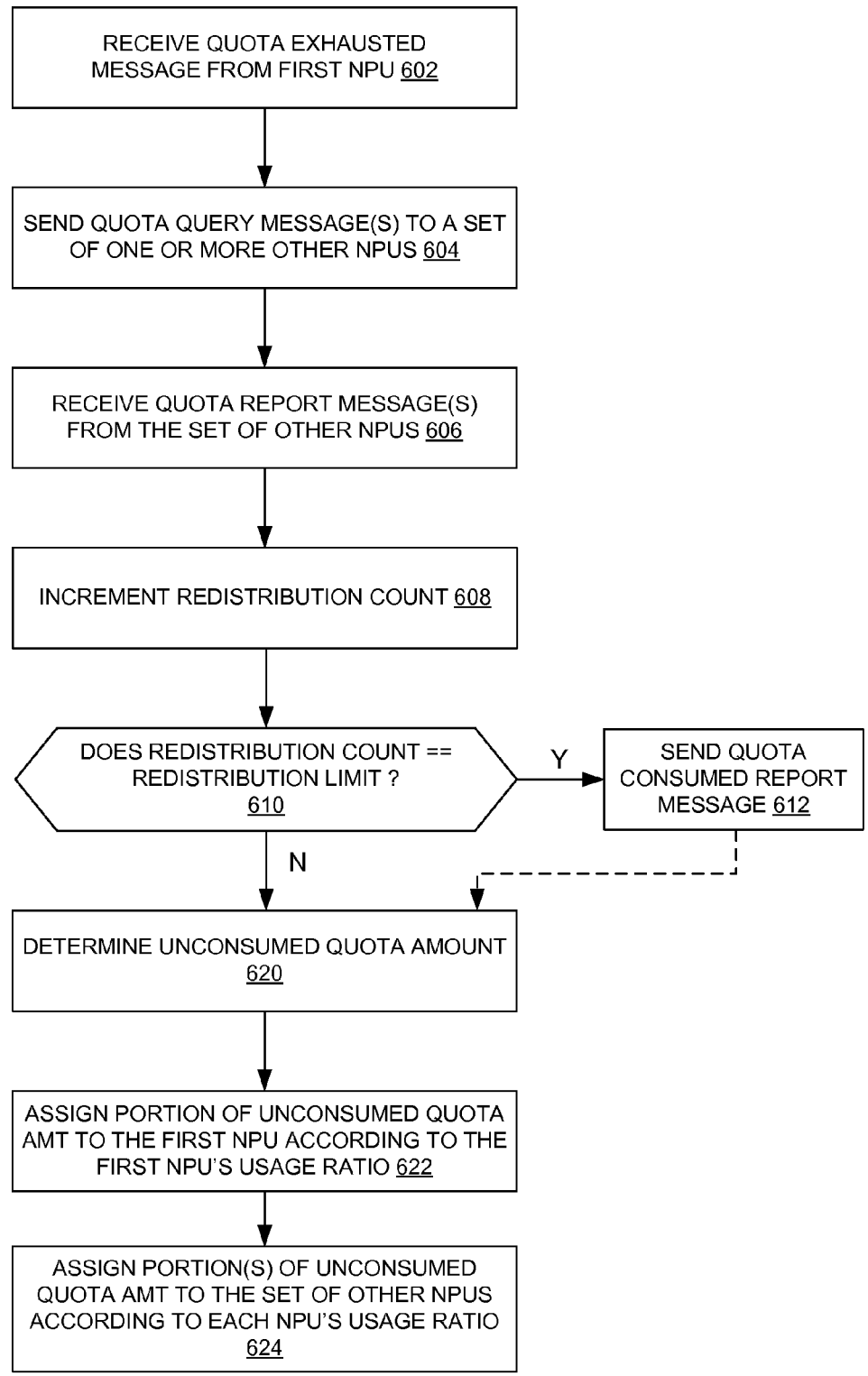
FIG. 6 illustrates a flow diagram of a method in a network element for quota redistribution according to an embodiment of the invention.

FIG. 6 illustrates a similar flow diagram of a method in a network element for quota redistribution according to an embodiment of the invention, and differs from FIG. 5 at least in that it utilizes a different method for determining whether to send a quota consumed report message to a remote quota server. In block 602, the quota management module 112 receives a quota exhausted message from a first NPU (e.g. 116A). The quota management module 112 determines to redistribute an unconsumed quota amount, and sends one or more quota query messages to a set of one or more other NPUs 116B-116N in block 604. The quota management module 112 receives one or more quota report messages from the set of other NPUs 116B-116N in block 604. In one embodiment of the invention, the one or more quota query messages are quota consumed query messages and the one or more quota report messages are quota consumed report messages. In another embodiment of the invention, the one or more quota query messages are quota available query messages and the one or more quota report messages are quota available report messages.

In block 608, the quota management module 112 increments a redistribution count 134, and then a decision point occurs in block 610: if the redistribution count 134 is equal to a redistribution limit 135, the quota management module 112 sends a quota consumed report message to a remote quota server 104 in block 612. Depending upon the embodiment of the invention, the quota management module 112 may or may not refuse to redistribute any remaining unconsumed quota amount. If the redistribution count 134 is not equal to a redistribution limit 135, the quota management module 112 will determine an unconsumed quota amount as in block 620. In block 622, the quota management module 112 will assign a portion of the unconsumed quota amount to the first NPU 116A according to a corresponding NPU usage ratio 131 for that NPU 116A, and will assign one or more portions of the unconsumed quota amount to each of the set of other NPUs 116B-116N according to each NPU's corresponding NPU usage ratio 131.

Figure 7:
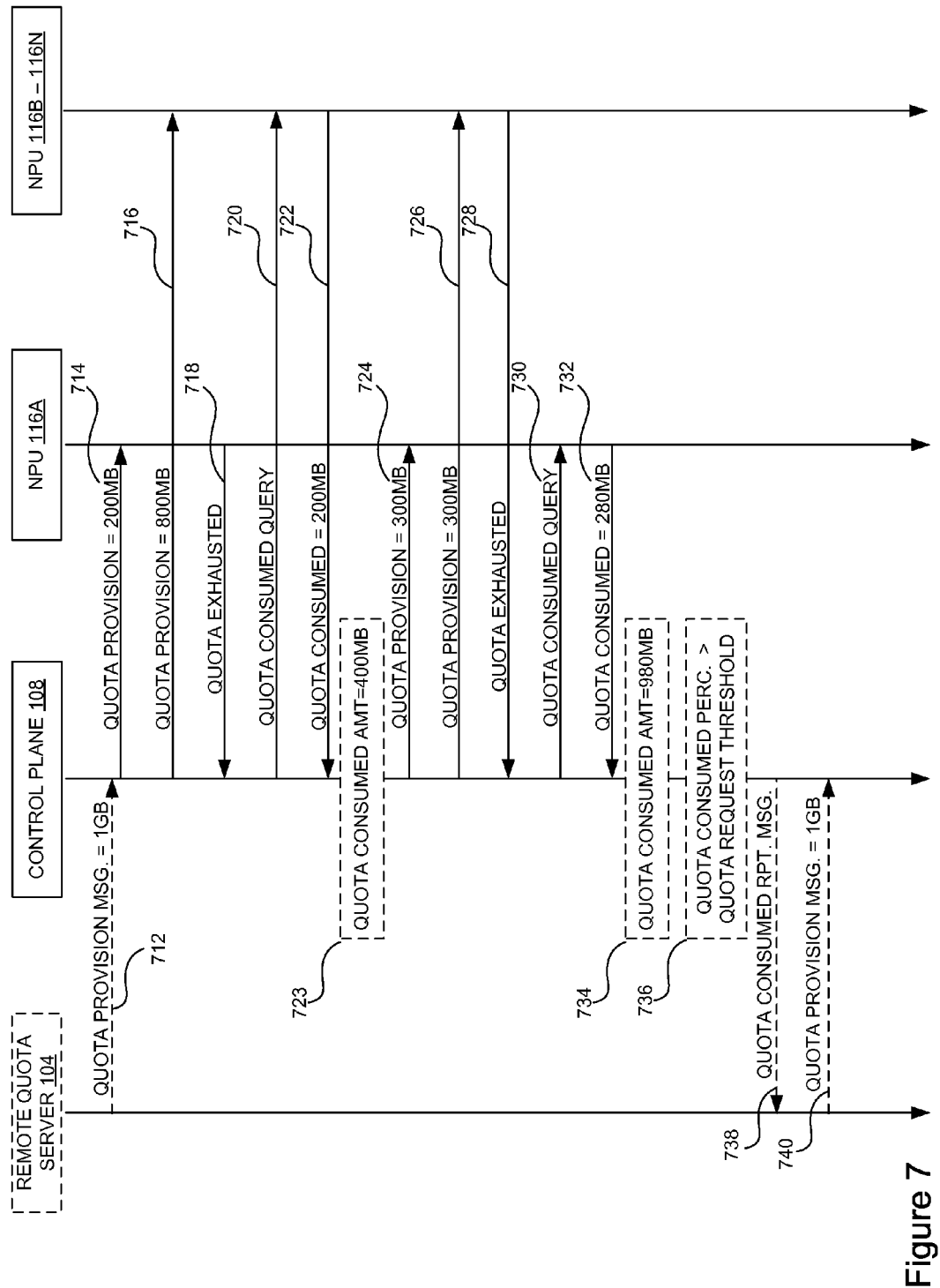
FIG. 7 illustrates a sequence diagram depicting a quota management process in a network according to an embodiment of the invention.
Figure 8:
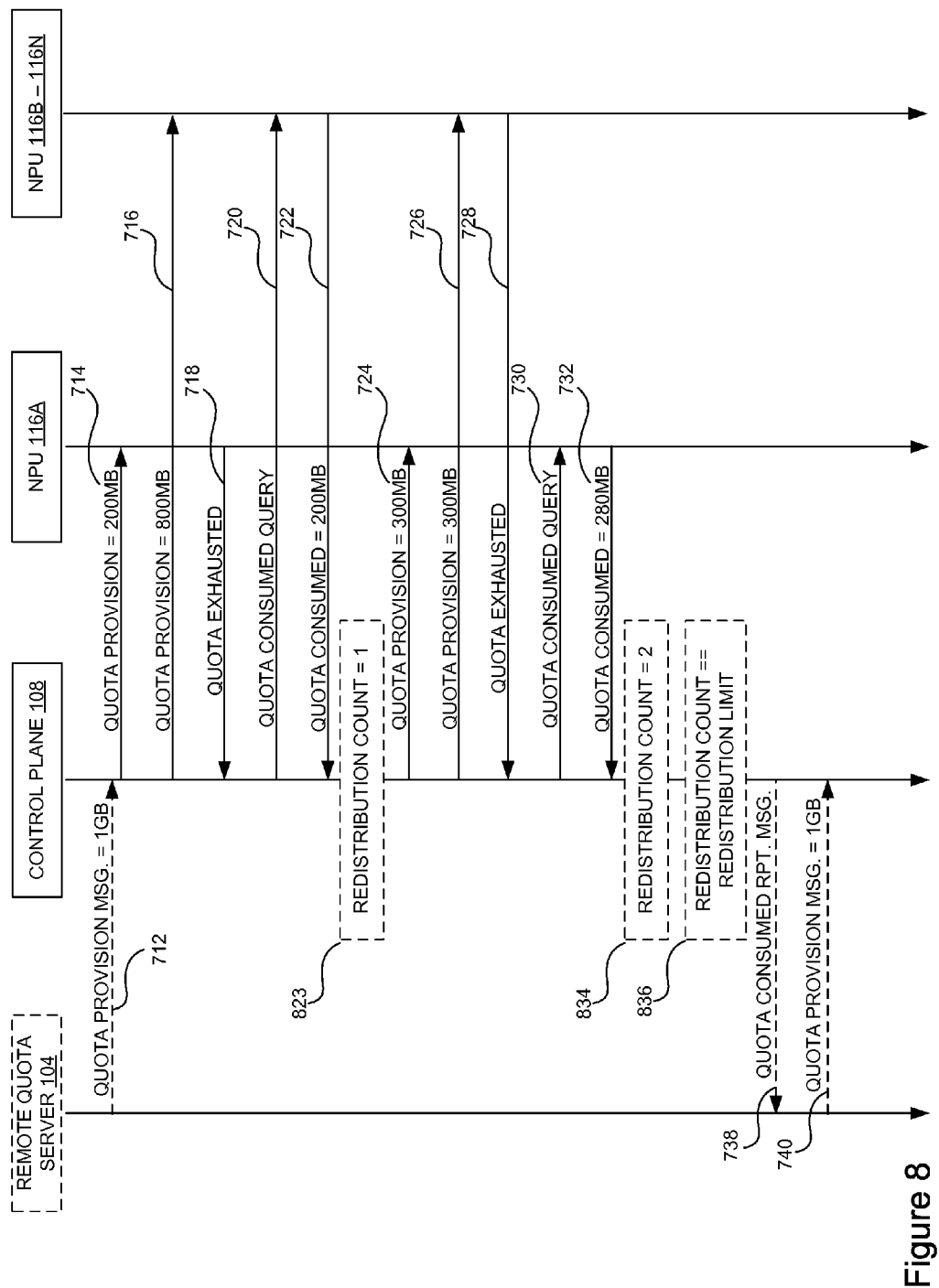
FIG. 8 illustrates a sequence diagram depicting a quota management process in a network according to an embodiment of the invention.

An example illustrating the flow of FIG. 5 is presented in FIG. 7, which illustrates a sequence diagram depicting a quota management process in a network according to an embodiment of the invention. Similarly, an example illustrating the flow of FIG. 6 is represented in FIG. 8, which also illustrates a sequence diagram depicting a quota management process in a network according to an embodiment of the invention. FIGS. 7 and 8 differ in how to determine whether to send a quota consumed report message to a remote quota server, and these differences will be detailed in the following paragraphs.

In one embodiment, a remote quota server 104 sends a quota provision message 712 to the network element 106 with a subscriber flow provisioned quota amount of 1 GB of traffic quota. The quota management module 112 notes the 1 GB of quota amount 130 for the subscriber flow and assigns a first portion of the quota amount—200 MB—to a first NPU 116A via a quota provision message 714. The quota management module 112 also assigns a second portion of the quota amount—800 MB—to a second NPU 116B via a quota provision message 716. In this embodiment, the quota management module 112 determined the first portion of the quota amount and the second portion of the quota amount using a defined ratio of 20:80. In an embodiment where the forwarding plane 110 contains more than two NPUs (e.g. 116A-116N), this 800 MB may be assigned to a set of one or more other NPUs 116B-116N using multiple quota provision messages. After processing data for the subscriber flow for some period of time, the first NPU 116A consumes an amount of quota and sends the quota management module 112 a quota exhausted message 718. In this embodiment, the first NPU 116A has consumed the entire portion of its assigned quota—200 MB—but in other embodiments, the quota exhausted message 718 may indicate that the first NPU 116A has consumed an amount of quota 121A that is less than the entire assigned quota amount 119A.

Upon receipt of the quota exhausted message 718, the quota management module 112 determines to change the distribution of the unconsumed quota amount. To determine the unconsumed quota amount, the quota management module 112 sends a quota consumed query message 720 to NPU 116B. In response, NPU 116B sends a quota consumed report message 722 to the quota management module 112 that indicates it has consumed 200 MB of its assigned 800 MB.

The quota management module 112 calculates a quota consumed amount 723 of 400 MB based upon the quota exhausted message 718 and the quota consumed message 722. In an embodiment with more than two NPUs (e.g. 116A-116N), the quota management module 112 sends a quota consumed query message to all NPUs 116B-116N, receives quota consumed messages from NPUs 116B-116N, and calculates a quota consumed amount based upon the quota exhausted message 718 from the first NPU 116A and all quota consumed report messages received from the set of other NPUs 116B-116N in step 722. In this scenario the quota consumed percentage, which is based on the quota consumed amount 723, is not greater than a quota request threshold 133, so the quota management module 112 will not signal the remote quota server 104 at this time. Having determined that the quota consumed amount is 400 MB, the quota management module 112 calculates that there is 600 MB of unconsumed quota amount remaining to be redistributed.

Instead of calculating a quota consumed amount 723, the embodiment of FIG. 8 presents a method of operation where the quota management module 112 instead increments a redistribution count 823 to track the number of times the provisioned quota amount 130 has been redistributed between the NPUs 116A-116N in the forwarding plane 110. Because the redistribution count 823 does not equal a defined redistribution limit 135, the quota management module 112 will not signal the remote quota server 104 at this time. In this embodiment, the quota management module 112 will calculate that there is 600 MB of unconsumed quota amount remaining to be redistributed based upon the quota exhausted message 718 and all received quota consumed report messages 722. In another embodiment, the quota management module 112 may both increment a redistribution count 823 as well as calculate a quota consumed amount 723.

Turning back to FIG. 7, the quota management module 112 updates an NPU usage ratio 131 corresponding to the first NPU 116A, noting that it has consumed 50% of the quota consumed amount 132, which is 200 MB of the 400 MB. The quota management module 112 also updates an NPU usage ratio 131 corresponding to the second NPU 116B, noting that it has also consumed 50% of the quota consumed amount 132, which also is 200 MB of the 400 MB. Using these NPU usage ratios, the quota management module 112 determines that 50% of the unconsumed quota amount, or 300 MB of the 600 MB, shall be assigned to the first NPU 116A, and similarly 50% of the unconsumed quota amount, or 300 MB of the 600 MB, shall be assigned to the second NPU 116B. Thus, the quota management module 112 assigns 300 MB to the first NPU 116A with a quota provision message 724 and 300 MB to the second NPU 116B with a quota provision message 726. Again, in another embodiment where there are more than two NPUs (e.g. 116A-116N), each NPU will have a corresponding NPU usage ratio 131 and the unconsumed quota amount will be divided into portions for each NPU according to these NPU usage ratios 131 and assigned to each NPU using quota provision messages.

Now, the second NPU 116B exhausts its assigned quota amount 119B before the first NPU 116A exhausts its assigned quota amount 119A, and sends the quota management module 112 a quota exhausted message 728. This triggers the quota management module 112 to consider changing the distribution of the unconsumed quota amount. The quota management module 112 sends a quota consumed query message 730 to the first NPU 116A and receives a quota consumed report message 732 back indicating the first NPU 116A has a consumed amount 121A of 280 MB of its assigned quota amount 119A of 300 MB.

In an embodiment, the quota management module 112 calculates in block 734 that, of the original 1 GB of quota, the NPUs 116A-116B consumed 980 MB. In an embodiment of the invention having more than two NPUs (e.g. 116A-116N), after receiving the quota exhausted message 728 from the second NPU 116B, the quota management module 112 sends quota consumed query messages to the first NPU 116A and all other NPUs (excluding the second NPU 116B, because it sent the quota exhausted message 728), receives quota consumed report messages from these NPUs, and calculates a quota consumed amount based on the quota exhausted message 728 from the second NPU 116B and all received quota consumed report messages 732.

With a quota consumed amount of 980 MB, the quota management module 112 notes that the quota consumed percentage of 98% is greater than a quota request threshold 133. In the embodiment depicted in FIG. 1, the quota request threshold 133 is 95%. Because the quota consumed percentage exceeds the quota request threshold 133, the quota management module 112 is to send a quota consumed report message 738 to a remote quota server 104. The quota management module 112 may then receive a quota provision message 740 from the remote quota server 104 containing another provisioned quota amount 130, and the process may repeat.

In an embodiment, when the quota consumed percentage exceeds the quota request threshold 133, the quota management module 112 refuses to redistribute unconsumed quota amounts between the NPUs (e.g. 116A-116N) until another quota provision message 158 containing an additional provisioned quota amount is received from a remote quota server 104. This configuration eliminates a potential flood of quota exhausted message and quota provision message cycles from occurring as very small portions of quota are redistributed, quickly consumed, and redistributed again. This reduces signaling between the control plane 108 and the forwarding plane 110, and also prevents the quota management module 112 from needing to communicate with the NPUs 116A-116N to calculate quota consumed amounts.

In another embodiment, as detailed in FIG. 8, instead of calculating a quota consumed amount 734 and determining if a quota consumed percentage is greater than a quota request threshold 736, the quota management module 112 instead increments the redistribution count 834 to 2, which indicates that the provisioned quota amount 130 has been redistributed between the NPUs (e.g. 116A-116N) two times. In this embodiment, a defined redistribution limit 135 is set to 2, which indicates that the provisioned quota amount should be redistributed 2 times before signaling the remote quota server 104. The quota management module 112, upon determining that the redistribution count 134 is equal to the defined redistribution limit 135, sends a quota consumed report message 738 to a remote quota server 104 and may further receive a quota provision message 740 back from the remote quota server 104. In an embodiment, when the redistribution count 134 is equal to the defined redistribution limit 135, the quota management module 112 refuses to redistribute unconsumed quota amounts between the NPUs 116A-116N until another quota provision message 158 containing an additional provisioned quota amount is received from a remote quota server 104.

In an embodiment, the quota management module 112 is configured to utilize both approaches for determining when to signal the remote quota server 104: monitoring a first condition of whether the quota consumed percentage is greater than a quota request threshold 133 and monitoring a second condition of whether a redistribution count 134 is equal to a redistribution limit 135. The quota management module 112 is configured to signal the remote quota server 104 upon the first occurrence of either of the conditions, and thereafter refuses to redistribute unconsumed quota amounts until another quota provision message 158 containing an additional provisioned quota amount is received from the remote quota server 104.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
a network element, which is to be coupled between a data network and a subscriber end station, to act as a gateway to the data network for the subscriber end station and perform intelligent quota management of a quota that limits an amount of traffic sent through a subscriber traffic flow between the data network and the subscriber end station, the network element including:
   a first network processing unit (NPU) operable to communicate with the subscriber end station;
   a second NPU operable to communicate with the subscriber end station;
   a control plane, operable to communicate with the first NPU and second NPU, comprising a quota management module operable to:
      determine a quota amount for the quota associated with the subscriber traffic flow to be assigned to the first NPU and second NPU,
      assign a first portion of the quota amount to the first NPU and a second portion of the quota amount to the second NPU,
      determine to change the distribution of an unconsumed quota amount between the first NPU and the second NPU,
      determine the unconsumed quota amount,
      assign a portion of the unconsumed quota amount to the first NPU and another portion of the unconsumed quota amount to the second NPU, and
      send a quota consumed report message to a remote quota server, wherein the quota consumed report message includes a consumed quota amount, and wherein the consumed quota amount is to indicate an amount of the quota amount that has been consumed by the first NPU and the second NPU, and
   the control plane further comprising a quota tracking module operable to track a quota consumed amount, wherein the quota consumed amount is a portion of the quota amount that has been consumed by the first NPU and the second NPU, and wherein sending the quota consumed report message to the remote quota server is to occur in response to the quota consumed amount exceeding a request threshold, wherein the request threshold is to indicate a fraction of the quota amount that is to be consumed before sending the quota consumed report message to the remote quota server.

2. The apparatus of claim 1, wherein the quota management module is further operable to communicate with the remote quota server, wherein the quota management module is to determine the quota amount to be assigned to the first NPU and the second NPU based upon a quota provision message received from the remote quota server, wherein the quota provision message includes a provisioned quota amount.

3. The apparatus of claim 1, wherein a ratio of the first portion of the quota amount to the second portion of the quota amount is proportional to an historic NPU usage ratio, wherein the historic NPU usage ratio indicates a ratio of an amount of quota for the subscriber traffic flow that was consumed by the first NPU during all communications with the subscriber end station to another amount of quota for the subscriber traffic flow that was consumed by the second NPU during all communications with the subscriber end station.

4. The apparatus of claim 1, wherein the quota management module is to determine to change the distribution of the unconsumed quota amount between the first NPU and the second NPU upon receipt of a quota exhausted message from the first NPU, and wherein the quota exhausted message signifies that the first NPU has consumed an amount of its assigned quota amount.

5. The apparatus of claim 4, wherein the quota management module is to determine the unconsumed quota amount by:
   sending a quota consumed query message to the second NPU, wherein the quota consumed query message is to indicate a request for an amount of the portion of the quota amount that has been consumed by the second NPU;
   receiving a quota consumed report message from the second NPU, wherein the quota consumed report message comprises a consumed amount, and wherein the consumed amount is the amount of the portion of the quota amount that has been consumed by the second NPU; and
   determining the amount of the unconsumed quota amount based on the quota consumed report message.

6. The apparatus of claim 4, wherein the quota management module is to determine the unconsumed quota amount by:
   sending a quota available query message to the second NPU, wherein the quota available query message is to indicate a request for an amount of the portion of the quota amount that has not been consumed by the second NPU;
   receiving a quota available report message from the second NPU, wherein the quota available report message comprises an available amount, and wherein the available amount is the amount of the portion of the quota amount that has not been consumed by the second NPU; and
   determining the amount of the unconsumed quota amount based on the quota available report message.

7. A method in a network element acting as a gateway in a communications network for intelligent quota management, the method comprising:
   managing a first quota that is associated with a subscriber traffic flow and that limits an amount of traffic travelling between the network element and a subscriber end station in the subscriber traffic flow, the managing including:
      assigning a first quota portion to a first network processing unit (NPU), wherein the first quota portion is a portion of the first quota;
      assigning a second quota portion to a set of one or more other NPUs, wherein the second quota portion is another portion of the first quota;
      determining to change the distribution of an unconsumed quota amount of the first quota;
      determining the unconsumed quota amount of the first quota;
      assigning a third quota portion to the first NPU, wherein the third quota portion is a portion of the unconsumed quota amount of the first quota; and
      assigning a fourth quota portion to the set of other NPUs, wherein the fourth quota portion is another portion of the unconsumed quota amount of the first quota; and
   sending a quota consumed report message for the first quota to a remote quota server, wherein the quota consumed report message includes a consumed quota amount, wherein the consumed quota amount indicates an amount of the first quota that has been consumed by the first NPU and the set of other NPUs;
   wherein the sending the quota consumed report message for the first quota to the remote quota server occurs when a quota consumed amount exceeds a request threshold, wherein the quota consumed amount is a portion of the first quota that has been consumed by the first NPU and the set of other NPUs since a last quota provision message for the first quota was received from the remote quota server, wherein a quota provision message includes a quota provision amount, the quota provision amount indicating a quota amount to be added to the first quota, and wherein the request threshold indicates a fraction of the quota amount that is to be consumed before sending the quota consumed report message to the remote quota server.

8. The method of claim 7, further comprising:
   receiving the quota provision message for the first quota from the remote quota server, wherein the quota provision message includes a provisioned quota amount indicating a quota amount for the first quota; and
   determining the first quota based on the provisioned quota amount.

9. The method of claim 7, wherein the first quota portion and the second quota portion are assigned in proportion to an historic NPU usage ratio, wherein the historic NPU usage ratio indicates an amount of the first quota consumed by each NPU during all communications with the subscriber end station.

10. The method of claim 7, wherein the third quota portion and the fourth quota portion are assigned in proportion to an NPU usage ratio, wherein the NPU usage ratio indicates an amount of the first quota consumed by the first NPU in relation to another amount of the first quota consumed by the set of other NPUs.

11. The method of claim 7, wherein the determining to change the distribution of the unconsumed quota amount of the first quota comprises receiving a quota exhausted message from the first NPU, the quota exhausted message indicating that the first NPU has consumed an amount of the first quota portion.

12. The method of claim 11, wherein the quota exhausted message indicates that the first NPU has consumed the first quota portion.

13. The method of claim 11, wherein the determining the unconsumed quota amount of the first quota comprises:

sending a quota consumed query message to each of the set of other NPUs, wherein each quota consumed query message indicates a request for an amount of the portion of the first quota that has been consumed by a corresponding one of the set of other NPUs;

receiving one or more quota consumed report messages from the set of other NPUs, the quota consumed report messages comprising a consumed amount, wherein the consumed amount is the amount of the portion of the first quota consumed by a corresponding one of the set of other NPUs; and determining the amount of the first quota that is unconsumed based on the one or more quota consumed report messages.

14. The method of claim 11, wherein the determining the unconsumed quota amount of the first quota comprises:

sending a quota available query message to each of the set of other NPUs, wherein the quota available query message indicates a request for an amount of the portion of the first quota that has not been consumed by a corresponding one of the set of other NPUs;

receiving one or more quota available report messages from the set of other NPUs, the quota available report messages comprising an available amount, wherein the available amount is the amount of the portion of the first quota not consumed by a corresponding one of the set of other NPUs; and determining the amount of the first quota that is unconsumed based on the one or more quota available report messages.

15. An apparatus comprising:

a network element, which is to be coupled between a data network and a subscriber end station, to act as a gateway to the data network for the subscriber end station and perform intelligent quota management of a quota that limits an amount of traffic sent through a subscriber traffic flow between the data network and the subscriber end station, the network element including:

a first network processing unit (NPU) operable to communicate with the subscriber end station;

a second NPU operable to communicate with the subscriber end station;

a control plane, operable to communicate with the first NPU and second NPU, comprising a quota management module operable to:

determine a quota amount for the quota associated with the subscriber traffic flow to be assigned to the first NPU and second NPU, assign a first portion of the quota amount to the first NPU and a second portion of the quota amount to the second NPU, determine to change the distribution of an unconsumed quota amount between the first NPU and the second NPU, determine the unconsumed quota amount, assign a portion of the unconsumed quota amount to the first NPU and another portion of the unconsumed quota amount to the second NPU, and send a quota consumed report message to a remote quota server, wherein the quota consumed report message includes a consumed quota amount, and wherein the consumed quota amount is to indicate an amount of the quota amount that has been consumed by the first NPU and the second NPU; and the control plane further comprising a quota tracking module operable to track a redistribution count, wherein the redistribution count is the number of times the quota amount has been redistributed between the first NPU and the second NPU, wherein sending the quota consumed report message to the remote quota server occurs in response to the redistribution count being equal to a redistribution limit, wherein the redistribution limit is to indicate the number of times the quota amount is to be redistributed before sending the quota consumed report message to the remote quota server.

16. The apparatus of claim 15, wherein the quota management module is further operable to communicate with the remote quota server, wherein the quota management module is to determine the quota amount to be assigned to the first NPU and the second NPU based upon a quota provision message received from the remote quota server, wherein the quota provision message includes a provisioned quota amount.

17. The apparatus of claim 15, wherein a ratio of the first portion of the quota amount to the second portion of the quota amount is proportional to an historic NPU usage ratio, wherein the historic NPU usage ratio indicates a ratio of an amount of quota for the subscriber traffic flow that was consumed by the first NPU during all communications with the subscriber end station to another amount of quota for the subscriber traffic flow that was consumed by the second NPU during all communications with the subscriber end station.

18. A method in a network element acting as a gateway in a communications network for intelligent quota management, the method comprising:

managing a first quota that is associated with a subscriber traffic flow and that limits an amount of traffic travelling between the network element and a subscriber end station in the subscriber traffic flow, the managing including:

assigning a first quota portion to a first network processing unit (NPU), wherein the first quota portion is a portion of the first quota;

assigning a second quota portion to a set of one or more other NPUs, wherein the second quota portion is another portion of the first quota;

determining to change the distribution of an unconsumed quota amount of the first quota;

determining the unconsumed quota amount of the first quota;

assigning a third quota portion to the first NPU, wherein the third quota portion is a portion of the unconsumed quota amount of the first quota; and assigning a fourth quota portion to the set of other NPUs, wherein the fourth quota portion is another portion of the unconsumed quota amount of the first quota; and sending a quota consumed report message for the first quota to a remote quota server, wherein the quota consumed report message includes a consumed quota amount, wherein the consumed quota amount indicates an amount of the first quota that has been consumed by the first NPU and the set of other NPUs;

wherein the sending the quota consumed report message for the first quota occurs responsive to a redistribution count being equal to a redistribution limit, wherein the redistribution count is a number of times the determination to change the distribution of the first quota has occurred since a last quota provision message for the first quota was received from the remote quota server, wherein a quota provision message includes a quota provision amount, the quota provision amount indicating a quota amount to be added to the first quota, and wherein the redistribution limit is a defined number of times the amount of the first quota that is unconsumed is to be redistributed to a set of one or more NPUs before sending the quota consumed report message to the remote quota server.

19. The method of claim 18, wherein the third quota portion and the fourth quota portion are assigned in proportion to an NPU usage ratio, wherein the NPU usage ratio indicates an amount of the first quota consumed by the first NPU in relation to another amount of the first quota consumed by the set of other NPUs.

20. The method of claim 18, wherein the determining to change the distribution of the unconsumed quota amount of the first quota comprises receiving a quota exhausted message from the first NPU, the quota exhausted message indicating that the first NPU has consumed an amount of the first quota portion.

* * * * *